US012081932B2

(12) United States Patent
Lee et al.

(10) Patent No.: US 12,081,932 B2
(45) Date of Patent: Sep. 3, 2024

(54) ELECTRONIC DEVICE FOR REDUCING INTERNAL NOISE AND METHOD THEREOF

(71) Applicant: Samsung Electronics Co., Ltd., Suwon-si (KR)

(72) Inventors: Seungho Lee, Suwon-si (KR); Haekeu Park, Suwon-si (KR); Youngseok Bang, Suwon-si (KR); Ikhyun Cho, Suwon-si (KR); Chijeong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 17/572,980

(22) Filed: Jan. 11, 2022

(65) Prior Publication Data

US 2022/0225008 A1 Jul. 14, 2022

Related U.S. Application Data

(63) Continuation of application No. PCT/KR2022/000322, filed on Jan. 7, 2022.

(30) Foreign Application Priority Data

Jan. 12, 2021 (KR) ........................ 10-2021-0004099

(51) Int. Cl.
*H04R 1/10* (2006.01)
*G10K 11/178* (2006.01)
*H04W 4/80* (2018.01)

(52) U.S. Cl.
CPC ......... *H04R 1/1041* (2013.01); *G10K 11/178* (2013.01); *H04R 1/1016* (2013.01);
(Continued)

(58) Field of Classification Search
CPC ......................... H04R 1/1041; H04R 2430/01; H04R 1/1016; H04W 4/80; H04W 52/02;
(Continued)

(56) References Cited

U.S. PATENT DOCUMENTS 10,122,204 B2 11/2018 Saunamaki et al.
2010/0189268 A1 7/2010 Haartsen et al.
(Continued)

FOREIGN PATENT DOCUMENTS

EP 3 712 885 A1 9/2020
JP 2011-043691 A 3/2011
(Continued)

OTHER PUBLICATIONS

International Search Report dated Apr. 14, 2022, issued in International Application No. PCT/KR2022/000322.
(Continued)

*Primary Examiner* — Jason R Kurr
(74) *Attorney, Agent, or Firm* — Jefferson IP Law, LLP

(57) ABSTRACT

An electronic device is provided. The electronic device includes a speaker, a communication module configured to communicate with an external electronic device, and a processor, wherein the processor is configured to identify whether the electronic device is worn, identify a function being executed by the processor, and control the output power of the communication module based on the identified whether the electronic device is worn and the identified function being executed.

22 Claims, 5 Drawing Sheets

START

IDENTIFY WHETHER ELECTRONIC DEVICE IS WORN — 410

IDENTIFY FUNCTION BEING EXECUTED — 420

CONTROL OUTPUT POWER OF COMMUNICATION MODULE BASED ON IDENTIFIED WHETHER ELECTRONIC DEVICE IS WORN AND IDENTIFIED FUNCTION BEING EXECUTED — 430

END

(52) U.S. Cl.
CPC ...... *H04W 4/80* (2018.02); *G10K 2210/1081* (2013.01); *H04R 2430/01* (2013.01)

(58) Field of Classification Search
CPC ......... H04W 52/0251; H04W 52/0254; G10K 11/178; G10K 2210/1081
See application file for complete search history.

(56) References Cited

U.S. PATENT DOCUMENTS

| | | | | |
|---|---|---|---|---|
| 2012/0207318 | A1 | 8/2012 | Tsuchiya et al. | |
| 2014/0133669 | A1* | 5/2014 | Klinghult | H04R 1/1041 381/74 |
| 2014/0328488 | A1* | 11/2014 | Caballero | G01S 15/02 381/58 |
| 2015/0189434 | A1 | 7/2015 | Hendrix et al. | |
| 2015/0296460 | A1 | 10/2015 | Lee et al. | |
| 2017/0181093 | A1* | 6/2017 | Lin | G04G 19/12 |
| 2017/0195772 | A1 | 7/2017 | Han et al. | |
| 2017/0264987 | A1 | 9/2017 | Hong et al. | |
| 2019/0149906 | A1* | 5/2019 | Rabb | H04W 52/52 381/74 |
| 2019/0394339 | A1 | 12/2019 | Seo et al. | |
| 2020/0007977 | A1 | 1/2020 | Gong et al. | |
| 2022/0165245 | A1 | 5/2022 | McCutcheon et al. | |

FOREIGN PATENT DOCUMENTS

| | | | |
|---|---|---|---|
| JP | 2012-169828 | A | 9/2012 |
| KR | 10-2015-0117577 | A | 10/2015 |
| KR | 10-2017-0082022 | A | 7/2017 |
| KR | 10-1953866 | B1 | 3/2019 |
| KR | 10-2019-0094131 | A | 8/2019 |
| KR | 10-2020-0121623 | A | 10/2020 |

OTHER PUBLICATIONS

Extended European Search Report dated Apr. 15, 2024, issued in European Application No. 22739591.0-1218.

* cited by examiner

ELECTRONIC DEVICE FOR REDUCING INTERNAL NOISE AND METHOD THEREOF

CROSS-REFERENCE TO RELATED APPLICATION(S)

This application is a continuation application, claiming priority under § 365(c), of an International application No. PCT/KR2022/000322, filed on Jan. 7, 2022, which is based on and claims the benefit of a Korean patent application number 10-2021-0004099, filed on Jan. 12, 2021, in the Korean Intellectual Property Office, the disclosure of which is incorporated by reference herein in its entirety.

TECHNICAL FIELD

The disclosure relates to an electronic device. More particularly, the disclosure relates to an electronic device for reducing internal noise and a method for operating the same.

BACKGROUND ART

In line with development of mobile communication and hardware/software technologies, portable electronic devices epitomized by smartphones (hereinafter, referred to as electronic devices) have been connected to various accessories, such as watches and wireless earphones and become able to provide various functions.

Electronic devices may use audio accessories to provide users with audio data generated by applications or audio data of communication counterparts. Audio accessories have a recent trend from wired to wireless schemes. Audio accessories may include earphones, headphones, earbuds, and speakers connected to electronic devices through short-range wireless communication (for example, Bluetooth communication). Earbuds among the same may refer to devices worn on left and right ears, respectively, so as to output audio data received through wireless communication.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device may generate noise in addition to sounds desired by the user. Noise generated by the electronic device may result from circuit-related or mechanical characteristics. For example, if the electronic device repeatedly generates an electric current in order to periodically communicate with another device, noise may be generated thereby. If the generated noise belongs to an audible frequency band, the user may hear the noise and, depending on the frequency band or repetition cycle, the generated noise may disturb the user.

Aspects of the disclosure are to address at least the above-mentioned problems and/or disadvantages and to provide at least the advantages described below. Accordingly, an aspect of the disclosure is to provide an electronic device for reducing internal noise and a method for operating the same.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a speaker, a communication module configured to communicate with an external electronic device, and a processor, wherein the processor is configured to identify whether the electronic device is worn, identify a function being executed by the processor, and control the output power of the communication module based on the identified whether the electronic device is worn and the identified function being executed.

In accordance with another aspect of the disclosure, an electronic device is provided. The electronic device includes a speaker, a communication module configured to perform short-range communication with an external electronic device, and a processor, wherein the processor is configured to control, when an input for controlling the volume of the speaker is received, the output power of the communication module based on the input volume of the speaker.

In accordance with another aspect of the disclosure, a method of operating an electronic device is provided. The method includes identifying whether the electronic device is worn, identifying a function being executed by the electronic device, and controlling the output power of the communication module based on the determined whether the electronic device is worn and the identified function being executed.

Advantageous Effects of Invention

According to various embodiments of the disclosure, the magnitude of noise generated by operations of an electronic device may be reduced. The user may not hear noise generated by operations of the electronic device.

In addition, according to various embodiments of the disclosure, an electronic device may adjust output power of a communication module, thereby increasing the battery use time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
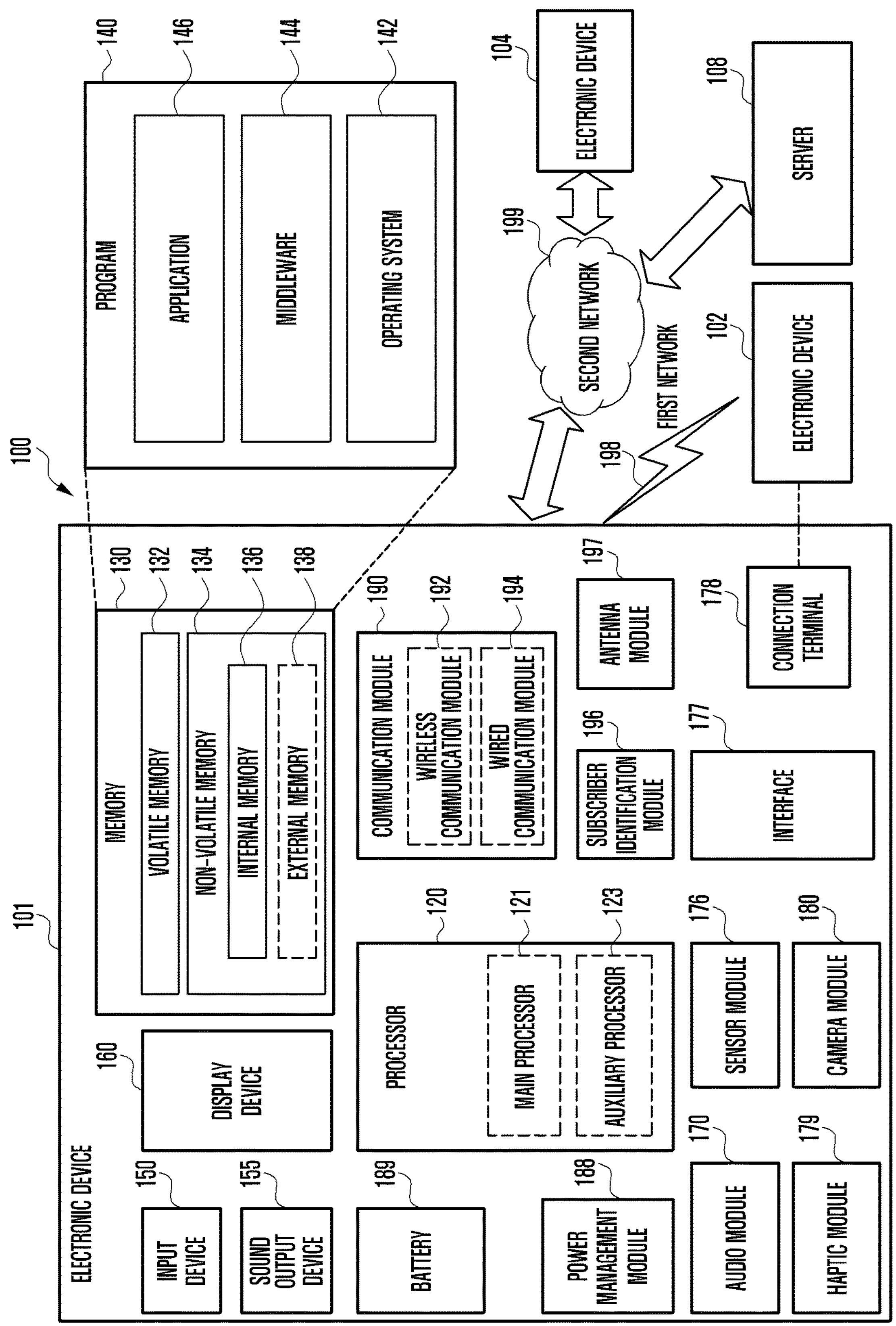
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
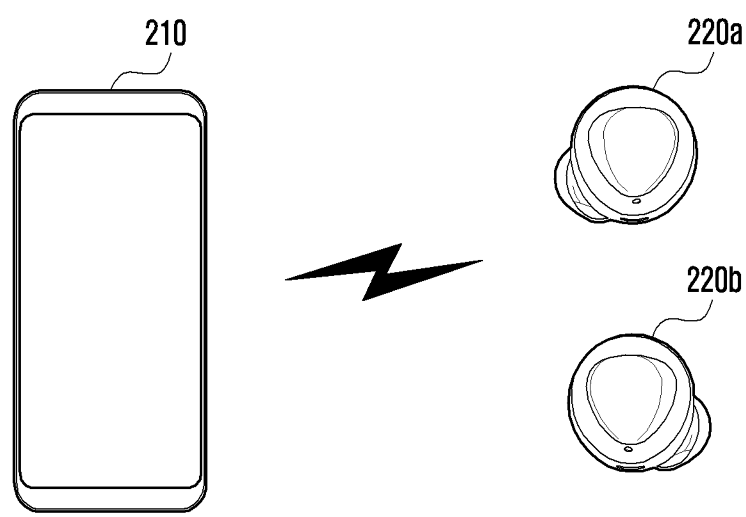
FIG. 2 illustrates an electronic device and an audio output device according to an embodiment of the disclosure.

FIG. 2 illustrates an electronic device and an audio output device according to an embodiment of the disclosure.

Referring to FIG. 2, according to various embodiments of the disclosure, an electronic device 210 (e.g., the electronic device 101 of FIG. 1) may be connected to audio output devices 220*a* and 220*b* using short-range wireless communication. The electronic device 210 may be connected to one audio output device 220*a* or 220*b* using short-range wireless communication, or may be connected to a plurality of audio output devices 220*a* and 220*b* including a true wireless stereo (TWS) function. The electronic device 210 may transmit/receive data to and from the audio output devices 220*a* and 220*b*. The audio output devices 220*a* and 220*b* may receive digital audio data from the electronic device 210 and may process the received digital audio data to output audio sound. The audio output devices 220*a* and 220*b* may be of a canal type capable of transmitting sound by sealing the user's ear. When the audio output devices 220*a* and 220*b* include a microphone, an audio signal received through a microphone may be converted into digital audio data and transmitted to the electronic device 210.

The implementation examples of the audio output devices 220*a* and 220*b* are not limited, and for example, the audio output devices may be implemented as various types of wireless audio accessories, such as speakers, earphones, headphones, and ear buds.

Referring to FIG. 2, the audio output devices 220*a* and 220*b* may include a first audio output device 220*a* and a second audio output device 220*b* that are physically and electrically separated from each other. The first audio output device 220*a* and the second audio output device 220*b* may be respectively mounted on the user's ears (left/right). According to various embodiments of the disclosure, the first audio output device 220*a* may operate as a master, and the second audio output device 220*b* may operate as a slave (or vice versa).

According to various embodiments of the disclosure, the electronic device 210 may generate audio data using various applications, and may transmit the generated audio data to the first audio output device 220*a* and/or the second audio output device 220*b* using short-range wireless communication. The first audio output device 220*a* may be connected to the electronic device 210 through short-range wireless communication to receive and output audio data, and the second audio output device 220*b* may receive and output audio data from the electronic device 210 or the first audio output device 220*a*. The first audio output device 220*a* and the second audio output device 220*b* may temporarily store the received audio data in a buffer memory and may output the stored audio data in a first-in and first-out manner.

Hereinafter, an audio output device will be described, but the audio output device is also a type of electronic device, and various embodiments described in the disclosure may be applied to an electronic device including functions and/or configurations described below.

Figure 3:
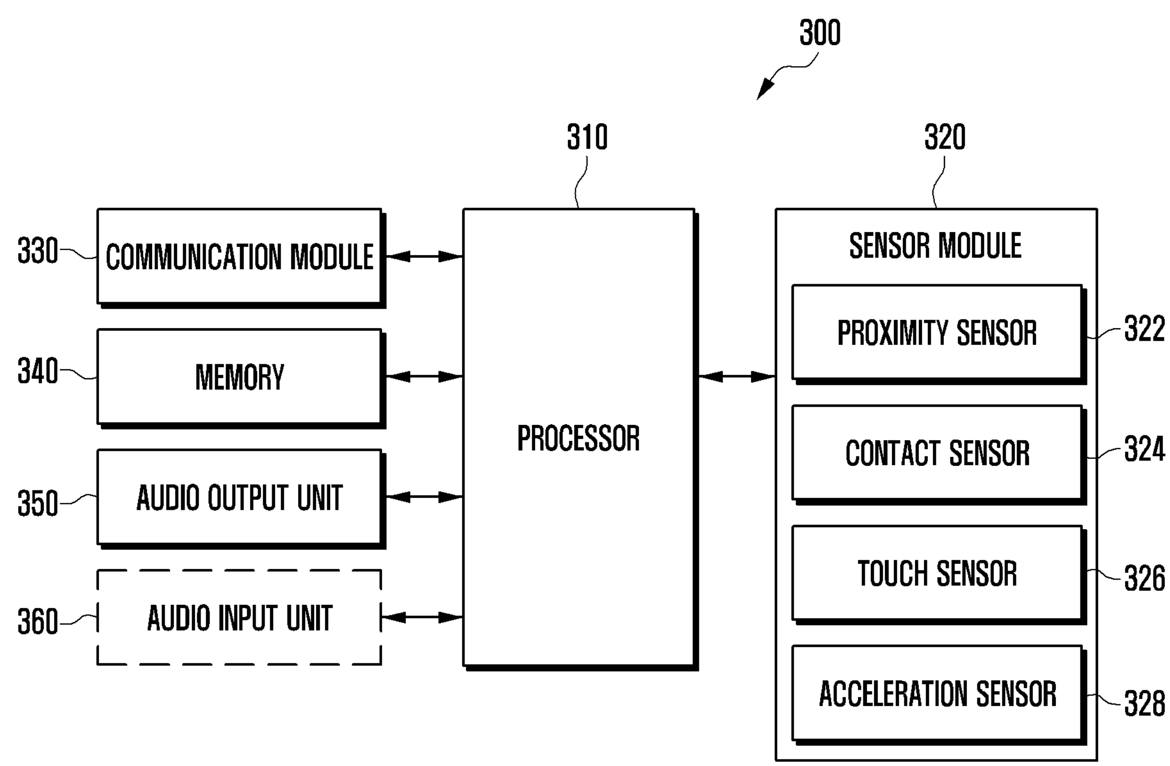
FIG. 3 is a block diagram illustrating an audio output device according to an embodiment of the disclosure.

FIG. 3 is a block diagram illustrating an audio output device according to an embodiment of the disclosure.

Referring to FIG. 3, an audio output device 300 (e.g., the audio output devices 220*a* and 220*b* of FIG. 2) is an electronic device, and may include a processor 310, a sensor module 320, a communication module 330, a memory 340, an audio output unit 350, and the sensor module 320 may include a proximity sensor 322, a contact sensor 324, a touch sensor 326, and an acceleration sensor 328. The audio output device 300 may further include an audio input unit 360, but may not necessarily include the audio input unit 360. Even if some of the components shown in FIG. 3 is omitted or substituted, various embodiments of the document may be implemented.

According to various embodiments of the disclosure, the audio output device 300 may include one set constituted of two (e.g., the first audio output device 220*a* and the second audio output device 220*b* of FIG. 2) to be worn on the user's both ears. Each of the audio output devices 220*a* and 220*b* included in one set may include the components described with reference to FIG. 3.

According to various embodiments of the disclosure, the communication module 330 may include various components, such as an antenna, a radio frequency (RF) front end, or a communication processor for performing wireless communication. The wireless communication supported by the communication module 330 may be, for example, short-range wireless communication, such as Bluetooth, but other standard or non-standard communication methods may be used.

The communication module 330 may receive audio data from an electronic device (e.g., the electronic device 210 of FIG. 2) using wireless communication, and may transmit information, such as the operation state (e.g., whether audio data is received, the battery state, or control signal) of the audio output device 300 to the electronic device 210. The communication module 330 may further transmit audio data to the audio output device configured as a slave when the audio output device 300 operates as a master.

The communication module 330 may process an audio signal received through the audio input unit 360 in the processor 310 and may transmit the output audio data to the electronic device 210.

According to various embodiments of the disclosure, the audio output unit 350 may output audio data buffered in the memory 340 under the control of the processor 310. The audio output unit 350 may output a result of a control operation related to audio output as audio data.

According to various embodiments of the disclosure, the audio input unit 360 may transmit the received audio signal to the electronic device 210 using the communication module 330 under the control of the processor 310. For example, an electrical signal corresponding to sound input through a microphone may be converted into audio data and may be transmitted to the electronic device 210 using the communication module 330.

According to various embodiments of the disclosure, the memory 340 may buffer the audio data received from the electronic device through the communication module 330. The electronic device 210 may transmit the generated audio data to the audio output device 300 in real time, and the audio data received from the audio output device 300 may be temporarily stored in the memory 340 and then may be output through the audio output unit 350 in a sequential manner. The audio output device 300 may output audio data in a first-in-first-out manner, and the output audio data may be deleted from the memory 340.

According to various embodiments of the disclosure, the audio output device 300 may include various sensors for detecting whether the audio output device 300 is worn on the user's ear. The sensors included in the sensor module 320 may be configured as hardware components independent of each other, and some of them (e.g., the touch sensor 326 and the contact sensor 324) may be electrically and/or functionally interconnected. The audio output device 300 may further include a configuration and/or a function of the sensor module 176 of FIG. 1.

According to various embodiments of the disclosure, the touch sensor 326 may be disposed on the rear surface of the audio output device 300 and may receive a user's touch input. According to various embodiments of the disclosure, the touch sensor 326 may be used as an input means for performing various control operations related to audio output.

According to various embodiments of the disclosure, the proximity sensor 322 may detect that an external object (e.g., a user's ear) approaches within a predetermined distance. The proximity sensor 322 may be implemented as an optical proximity sensor, but is not limited thereto. For example, various types of the proximity sensor 322, such as a magnetic proximity sensor, an ultrasonic proximity sensor, an inductive proximity sensor, or the like, may be used.

When the proximity sensor 322 is implemented as an optical proximity sensor, the proximity sensor 322 may include a light emitting unit (not shown) and a light receiving unit (not shown). The light emitting unit may output a predetermined amount of light (e.g., infrared light) and may include an infrared (IR) light emitting diode (LED). The light receiving unit may detect reflected light received by reflecting the light output from the light emitting unit to an external object, and may include a photo diode and/or an image sensor. The proximity sensor 322 may detect whether an external object approaches within a predetermined distance based on the amount of reflected light detected by the light receiving unit. For example, since the amount of reflected light is large when the external object is close, the proximity sensor 322 may detect how close the external object is to the proximity sensor 322 according to the magnitude of the amount of the reflected light. At this time, since the proximity sensor 322 determines whether the proximity sensor 322 is in proximity according to the amount of light, even if the proximity object is not a part of the body (e.g., an ear), the proximity sensor 322 may detect the proximity of the object.

According to various embodiments of the disclosure, the audio output device 300 may include a contact sensor 324. The contact sensor 324 may be disposed on the front surface of the audio output device 300. The audio output device 300 may include a plurality of contact sensors 324, and the plurality of contact sensors 324 may be disposed to be spaced apart from each other.

According to various embodiments of the disclosure, when the external object is a part of the body, the contact sensor 324 may detect the contact of the external object. For example, the contact sensor 324 may be implemented as a capacitive type sensor, and may not output a signal corresponding to contact detection when an external object that is not a part of the body comes into contact.

According to various embodiments of the disclosure, the contact sensor 324 may be configured as an integrated circuit (IC) as a part of the touch sensor 326. For example, the audio output device 300 may include a touch sensor 326 on the first surface, and may extend a part of the touch sensor 326 IC to a second surface by changing the register setting and sensitivity thereof, so that the extended touch sensor 326 IC may be used as the contact sensor 324. For example, when the user wears the audio output device 300, the contact sensor 324 may come into contact with the user's ear, and the touch sensor 326 may detect a contact at the corresponding location and may transmit the detected contact to the processor 310.

According to various embodiments of the disclosure, when the audio output device 300 includes a plurality of contact sensors, it is possible to improve misrecognition of the wearing state of the audio output device 300.

According to various embodiments of the disclosure, the acceleration sensor 328 may detect the acceleration of the audio output device 300 and/or the intensity of impact. The acceleration sensor 328 may be an inertia sensor or a gyroscope.

According to various embodiments of the disclosure, the processor 310 may perform a function of controlling each component of the audio output device 300. To this end, the processor 310 may be electrically, functionally, and/or operatively connected to each component of the audio output device 300, such as the communication module 330, the audio output unit 350, the memory 340, each sensor of the sensor module 320, or the like. According to various embodiments of the disclosure, the audio output device 300 may include a main processor, a sensor hub, a bio processor, and a neural processor, and some of the operations of the processor 310 described in the disclosure may be performed by the above-exemplified processors, respectively. Although the function performed by the processor 310 is not limited, various operations of the processor 310 for reducing noise in the audio output device 300 will be described in the disclosure.

According to various embodiments of the disclosure, the processor 310 may determine whether the audio output device 300 is worn on the user's ear based on detection results of the contact sensor 324 and the proximity sensor 322. More specifically, when the contact sensor 324 detects a body contact and the proximity sensor 322 detects the proximity of an object in a state in which the audio output device 300 is not worn, the processor 310 may determine that the audio output device 300 is worn. According to various embodiments of the disclosure, unlike the determination of the worn state, in a case in which the audio output device 300 is determined from the worn state to the non-worn state, the processor 310 may determine the non-worn state using only the proximity sensor 322 when the proximity sensor 322 detects that the object is separated from the audio output device 300 by a predetermined distance.

According to various embodiments of the disclosure, the processor 310 may determine the state of the audio output device 300 as one of a charging state, an idle state, a non-worn state, and a worn state according to a detection value received from each sensor.

According to various embodiments of the disclosure, when the audio output device 300 is detected as being worn, the processor 310 may perform operations, such as establishment of a short-range wireless connection with the electronic device, output of audio data through the audio output unit 350, and the like. When it is determined that the audio output device 300 is not worn while outputting audio data, the processor 310 may stop the output of the audio data.

According to various embodiments of the disclosure, the audio output device 300 may further include a battery (not shown).

According to various embodiments of the disclosure, the electronic device 210 connected to the audio output device through wireless communication may also have the same components as the audio output device described with reference to FIG. 3. Alternatively, the electronic device 210 may omit or replace some of the components included in the audio output device described with reference to FIG. 3.

Figure 4:
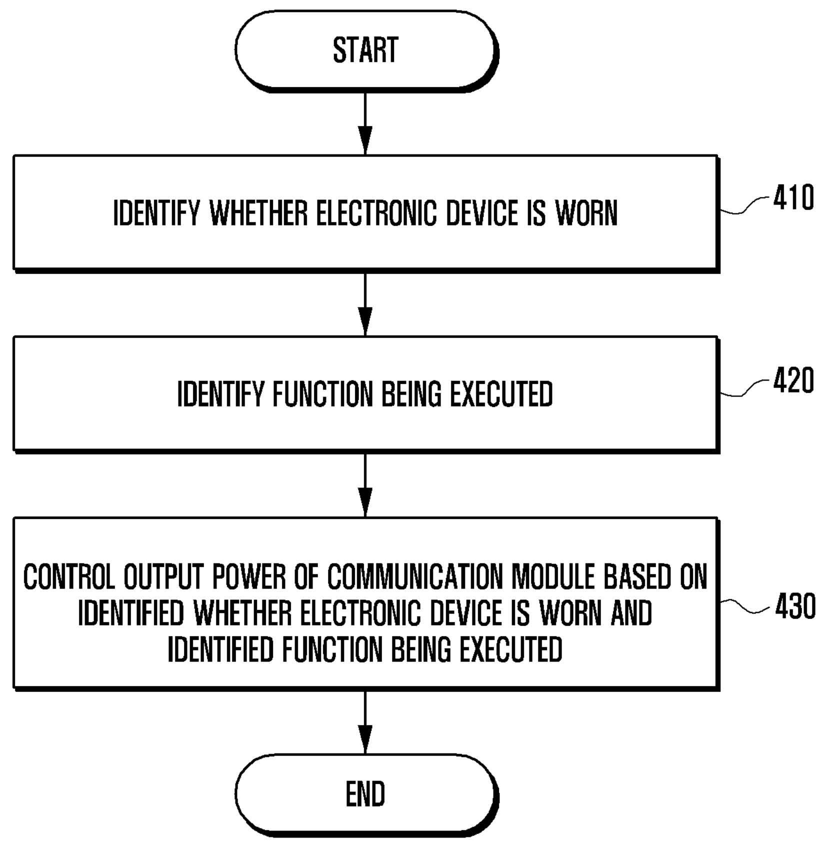
FIG. 4 is a flowchart illustrating an electronic device according to an embodiment of the disclosure.

FIG. 4 is a flowchart illustrating an electronic device according to an embodiment of the disclosure.

Referring to FIG. 4, according to various embodiments of the disclosure, whether the various embodiments disclosed in the disclosure are to be applied may be selected by a corresponding mode. When the corresponding mode is selected, the electronic device may apply various embodiments according to the disclosure. The selection may be made by the user.

According to various embodiments of the disclosure, in operation 410, an electronic device (e.g., the audio output device 300 of FIG. 3) may determine whether the electronic device is worn. For example, the electronic device may determine whether the electronic device is worn on the user's ear using at least one sensor (e.g., a proximity sensor {e.g., the proximity sensor 322 of FIG. 3} or/and a contact sensor {e.g., the contact sensor 324 of FIG. 3}) included in a sensor module (e.g., the sensor module 320 of FIG. 3).

According to various embodiments of the disclosure, in operation 420, the audio output device 300 may identify a function being executed. The operation of identifying the function being executed by the audio output device 300 may be described with reference to FIG. 5.

According to various embodiments of the disclosure, in operation 430, the audio output device 300 may control the output power of a communication module (e.g., the communication module 330 of FIG. 3) based on whether the electronic device is worn, which is determined in operation 410, and the function being executed, which is identified in operation 420. The audio output device 300 may control the output power of the communication module 330 to reduce the amount of noise generated inside the audio output device 300.

According to an embodiment of the disclosure, the audio output device 300 may store and manage, as a mapping table, the output power of the communication module to be controlled based on the function being executed and whether the audio output device 300 is worn. Table 1 and Table 2 below may be examples of the mapping table stored and/or managed by the audio output device 300. Referring to Table 1, the audio output device 300 may control the output power of the communication module to 14 dBm when sound is being reproduced at the maximum volume. Referring to Table 2, the audio output device 300 may control the output power of the communication module to 10 dBm when streaming is performed at the maximum volume.

TABLE 1

| Function being executed | Output power of communication module |
|---|---|
| Sound is being reproduced (maximum volume) | 14 dBm |
| Sound is being reproduced (medium volume) | 10 dBm |
| Sound is being reproduced (muted) | 7 dBm |
| Stop | 7 dBm |
| Active noise canceling function on | 7 dBm |
| Codec off | 7 dBm |
| Non-worn | 14 dBm |
| According to volume level | 7 to 14 dBm |

TABLE 2

| Function being executed | Output power of communication module |
|---|---|
| Idle (e.g., a condition in which internal noise is generated below a threshold value) | 8 dBm |
| During a call | 10 dBm |
| Firmware over the air (FOTA) | 14 dBm |
| Process | 14 dBm |
| During streaming (volume level 4 or lower) | 8 dBm |
| During streaming (volume level 5 or higher) | 10 dBm |

According to an embodiment of the disclosure, the audio output device 300 may detect the magnitude of noise in an audible frequency band (20 to 20 kHz band), and may further control the output power of the communication module 330 when the detected magnitude of noise is greater than a predetermined threshold value.

According to an embodiment of the disclosure, the audio output device 300 may adjust the amount of data transmitted/received per unit time through the communication module 330. When the audio output device 300 adjusts the amount of data transmitted/received per unit time through the communication module 330, the output power of the communication module 330 may be reduced, and the level of the noise generated inside the audio output device 300 may be reduced or the noise frequency may be changed.

According to an embodiment of the disclosure, the audio output device 300 may control a transmission period of data transmitted/received through the communication module 330. When the audio output device 300 controls the transmission period of data transmitted and received using the communication module 330, the magnitude of the noise generated inside the audio output device 300 may be reduced or the noise frequency may be changed.

According to an embodiment of the disclosure, when the audio output device 300 changes the frequency of noise generated therein, the previously applied output power of the communication module may not be controlled.

Figure 5:
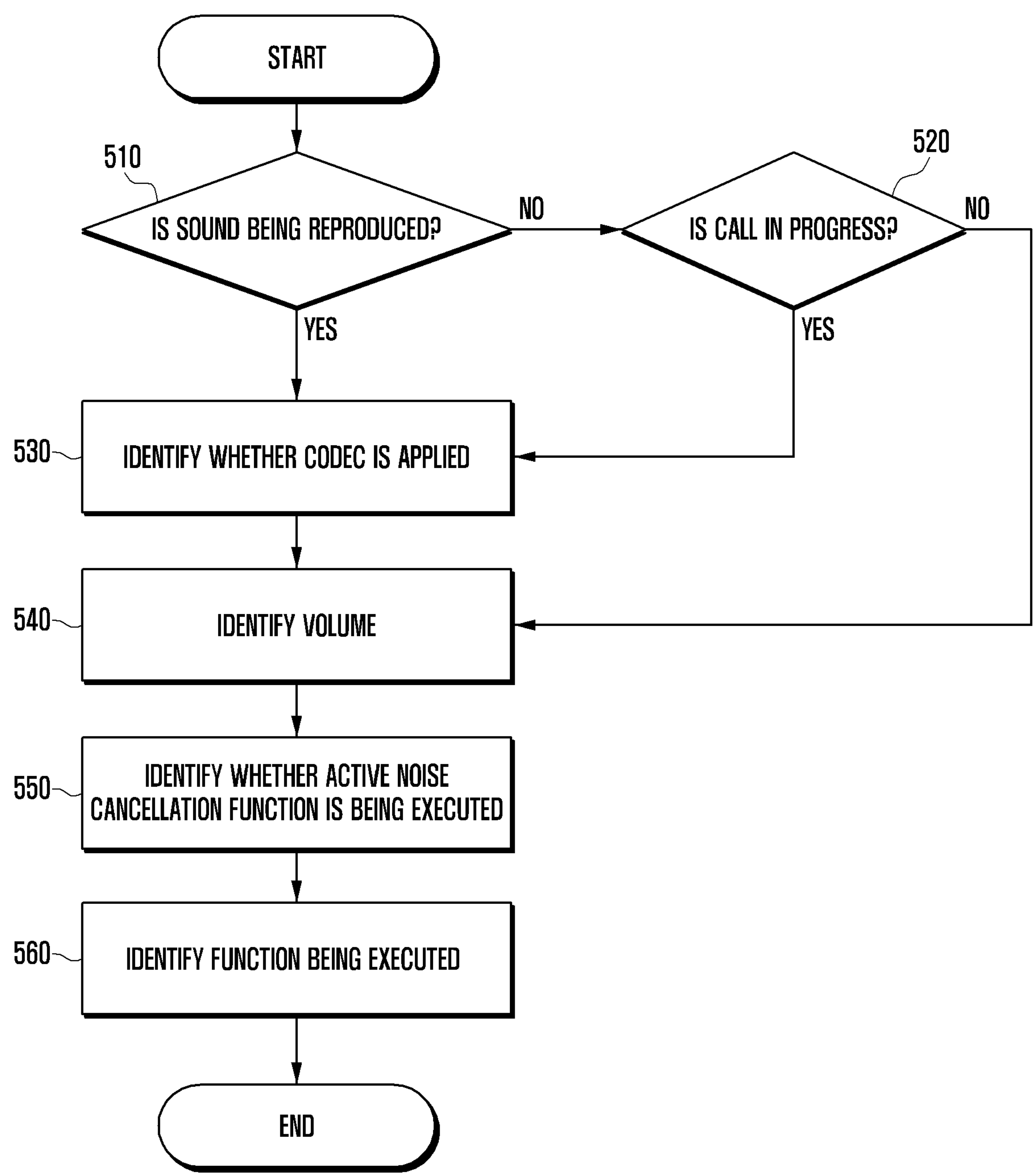
FIG. 5 is a flowchart of identifying a function being executed by an electronic device according to an embodiment of the disclosure.

FIG. 5 is a flowchart of identifying a function being executed by an electronic device according to an embodiment of the disclosure.

Referring to FIG. 5, according to various embodiments of the disclosure, in operation 510, an electronic device (e.g., the audio output device 300 of FIG. 3) may determine whether sound is being reproduced. For example, the audio output device 300 may determine that sound is being reproduced when music is being played or a video is being played. The audio output device 300 may use a communication module (e.g., the communication module 330 of FIG. 3) to continuously receive and reproduce the sound of music or video.

According to an embodiment of the disclosure, the audio output device 300 may use the communication module 330 to transmit the received sound of music or video to another electronic device connected through short-range wireless communication.

According to an embodiment of the disclosure, the audio output device 300 may use the communication module 330 to transmit whether audio data is received (e.g., play, pause, or stop), a battery state, or a control signal (e.g., whether the electronic device is worn or whether a function is executed), to another electronic device (e.g., the electronic device 210 of FIG. 2) connected through short-range wireless communication.

According to various embodiments of the disclosure, when it is determined that the sound is not being reproduced, the audio output device 300 may determine whether a call is in progress in operation 520. The audio output device 300 may use the communication module 330 to receive the counterpart's voice and transmit the user's voice.

According to various embodiments of the disclosure, in operation 530, the audio output device 300 may identify the volume when sound is being reproduced and a call is in progress. The noise inside the audio output device 300 may or may not be audible to the user depending on the sound or the volume of the user's voice during a call. For example, when the sound or the volume of the user's voice during a call is large, the noise inside the audio output device 300 may be relatively inaudible to the user. However, when the sound or the volume of the user's voice is small during a call, the noise inside the audio output device 300 may be relatively loud to the user.

According to various embodiments of the disclosure, in operation 540, when a call is not in progress, the audio output device 300 may identify a function being applied. For example, the audio output device 300 may determine whether an active noise cancellation function is being executed. The active noise cancellation function may be a function of removing external noise using the principle of superposition. The audio output device 300 may identify whether the active noise cancellation function is being executed even when sound is being reproduced, during a call, or when no sound is output (e.g., in an idle state). As another example, the audio output device 300 may determine whether a codec is being executed. The codec may be automatically executed in case of sound or a call, but in other cases, the codec may not always be executed, so the audio output device 300 may identify whether the codec is being executed. In addition, the audio output device 300 may identify whether there is another function being applied.

According to various embodiments of the disclosure, the identifying the function being applied by the audio output device 300 may not be an essential operation. The audio output device 300 may perform operation 550 when not performing operation 540. The audio output device 300 may determine the function being executed by identifying whether sound is being played, whether a call is in progress, and a volume.

According to various embodiments of the disclosure, in operation 550, the audio output device 300 may identify (or determine) the function being executed through operations 510 to 540. For example, the audio output device 300 may determine that a call is in progress at the volume level 4 through operations 510 to 540.

As another example, in operation 560, the audio output device 300 may identify that the active noise cancellation function is being executed through operations 510 to 540. The audio output device 300 may control the output power of the communication module (e.g., the communication module 330 of FIG. 3) based on the identified function being executed. The audio output device 300 may reduce the magnitude of noise generated inside the audio output device 300 by controlling the output power of the communication module 330 based on the function being executed.

An electronic device according to various embodiments of the disclosure may include a speaker, a communication module configured to communicate with an external electronic device, and a processor, wherein the processor may identify whether the electronic device is worn, may identify a function being executed by the processor, and may control the output power of the communication module based on the identified whether the electronic device is worn and the identified function being executed.

The processor of the electronic device according to various embodiments of the disclosure may determine whether an active noise cancellation function is being executed, and may control the output power of the communication module by further considering the determined whether the active noise cancellation function is being executed.

The processor of the electronic device according to various embodiments of the disclosure may determine whether sound is being reproduced, and may identify the function being executed based on the determined whether sound is being reproduced.

The processor of the electronic device according to various embodiments of the disclosure may control, when an input for controlling the volume of the speaker is received, the output power of the communication module by further considering the input volume of the speaker.

The processor of the electronic device according to various embodiments of the disclosure may determine whether a call is in progress, and may identify the function being executed based on the determined whether a call is in progress.

The processor of the electronic device according to various embodiments of the disclosure may further control the amount of data transmitted/received through the communication module per unit time.

The processor of the electronic device according to various embodiments of the disclosure may further control a transmission period of data transmitted/received through the communication module.

The processor of the electronic device according to various embodiments of the disclosure may further detect the magnitude of sound output through the speaker and/or noise generated inside the electronic device, and may control the output power of the communication module by further considering the detected magnitude of sound.

The communication module of the electronic device according to various embodiments of the disclosure may support short-range communication with the external electronic device.

An electronic device according to various embodiments of the disclosure may include a speaker, a communication module configured to communicate with an external electronic device, and a processor, wherein the processor may control, when an input for controlling the volume of the speaker is received, the output power of the communication module based on the input volume of the speaker.

The processor of the electronic device according to various embodiments of the disclosure may determine whether an active noise cancellation function is being executed, and may control the output power of the communication module by further considering the determined whether the active noise cancellation function is being executed.

A method of operating an electronic device according to various embodiments of the disclosure may include identifying whether the electronic device is worn, identifying a function being executed by the electronic device, and controlling the output power of the communication module based on the determined whether the electronic device is worn and the identified function being executed.

The method of operating an electronic device according to various embodiments of the disclosure may further include determining whether an active noise cancellation function is being executed, wherein the controlling of the output power of the communication module may include controlling the output power of the communication module by further considering the determined whether the active noise cancellation function is being executed.

The method of operating an electronic device according to various embodiments of the disclosure may further include determining whether sound is being reproduced, wherein the identifying of the function being executed by the electronic device may include identifying the function being executed based on the determined whether sound is being reproduced.

The method of operating an electronic device according to various embodiments of the disclosure may further include receiving an input for controlling the volume of the speaker, wherein the controlling of the output power of the communication module may include controlling the output power of the communication module by further considering the input volume of the speaker.

The method of operating an electronic device according to various embodiments of the disclosure may further include determining whether a call is in progress, wherein the identifying of the function being executed by the electronic device may include identifying the function being executed based on the determined whether the call is in progress.

The method of operating an electronic device according to various embodiments of the disclosure may further include controlling the amount of data transmitted/received through the communication module per unit time.

The method of operating an electronic device according to various embodiments of the disclosure may further include controlling a transmission period of data transmitted/received through the communication module.

The method of operating an electronic device according to various embodiments of the disclosure may further include detecting the magnitude of sound output through the speaker or/and noise generated inside the electronic device, wherein the controlling of the output power of the communication module may include controlling the output power of the communication module by further considering the detected magnitude of sound or/and the detected noise.

In the method of operating the electronic device according to various embodiments of the disclosure, the communication module may support short-range communication with an external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
- a speaker;
- memory storing one or more computer programs;
- communication circuitry configured to communicate with an external electronic device; and
- one or more processors communicatively coupled to the speaker, the memory, and the communication circuitry,
- wherein the one or more computer programs include computer-executable instructions that, when executed by the one or more processors, cause the electronic device to:
  - identify whether the electronic device is being worn,
  - identify a function being executed by the one or more processors, and
  - based on an input volume level of the speaker, a result of identifying whether the electronic device is being worn, and a result of identifying the function being executed, control an output power of the communication circuitry.

2. The electronic device of claim 1, wherein the one or more computer programs further include computer-executable instructions that, when executed by the one or more processors, cause the electronic device to:
- determine whether an active noise cancellation function is being executed, and
- control an output power of the communication circuitry further based on a result of determining whether the active noise cancellation function is being executed.

3. The electronic device of claim 1, wherein the one or more computer programs further include computer-executable instructions that, when executed by the one or more processors, cause the electronic device to:
- determine whether sound is being reproduced, and
- based on a result of determining whether sound is being reproduced, identify the function being executed.

4. The electronic device of claim 3, wherein the one or more computer programs further include computer-executable instructions that, when executed by the one or more processors, cause the electronic device to;

in response to receiving an input for controlling a volume of the speaker, control the output power of the communication circuitry further based on an input volume of the speaker.

5. The electronic device of claim 1, wherein the one or more computer programs further include computer-executable instructions that, when executed by the one or more processors, cause the electronic device to:

determine whether a call is in progress, and based on a result of determining whether the call is in progress, identify the function being executed.

6. The electronic device of claim 1, wherein the one or more computer programs further include computer-executable instructions that, when executed by the one or more processors, cause the electronic device to;

control an amount of data transmitted/received through the communication circuitry per unit time.

7. The electronic device of claim 1, wherein the one or more computer programs further include computer-executable instructions that, when executed by the one or more processors, cause the electronic device to:

control a transmission period of data transmitted/received through the communication circuitry.

8. The electronic device of claim 1, wherein the one or more computer programs further include computer-executable instructions that, when executed by the one or more processors, cause the electronic device to:

detect at least one of a magnitude of sound output through the speaker or noise generated inside the electronic device, and control the output power of the communication circuitry further based on at least one of the detected magnitude of sound or the detected noise.

9. The electronic device of claim 1, wherein the communication circuitry supports short-range communication with the external electronic device.

10. An electronic device comprising:

a speaker;

memory storing one or more computer programs;

communication circuitry configured to perform short-range communication with an external electronic device; and one or more processors communicatively coupled to the speaker, the memory, and the communication circuitry, wherein the one or more computer programs include computer-executable instructions that, when executed by the one or more processors, cause the electronic device to:

in response to receiving an input for controlling a volume of the speaker, control an output power of the communication circuitry based on an input volume of the speaker.

11. The electronic device of claim 10, wherein the one or more computer programs further include computer-executable instructions that, when executed by the one or more processors, cause the electronic device to:

determine whether an active noise cancellation function is being executed, and control the output power of the communication circuitry further based on a result of determining whether the active noise cancellation function is being executed.

12. A method of operating an electronic device, the method comprising:

identifying, by the electronic device, whether the electronic device is being worn;

identifying, by the electronic device, a function being executed by the electronic device; and based on an input volume level of a speaker, a result of identifying whether the electronic device is being worn, and a result of identifying the function being executed, controlling, by the electronic device, an output power of communication circuitry of the electronic device.

13. The method of claim 12, further comprising:

determining, by the electronic device, whether an active noise cancellation function is being executed, wherein the controlling of the output power of the communication circuitry includes controlling, by the electronic device, the output power of the communication circuitry further based on a result of determining whether the active noise cancellation function is being executed.

14. The method of claim 12, further comprising:

determining, by the electronic device, whether sound is being reproduced, wherein the identifying of the function being executed by the electronic device includes identifying, by the electronic device, the function being executed based on a result of determining whether sound is being reproduced.

15. The method of claim 14, further comprising:

receiving, by the electronic device, an input for controlling a volume of the speaker, wherein the controlling of the output power of the communication circuitry includes, controlling, by the electronic device, the output power of the communication circuitry further based on an input volume of the speaker.

16. The method of claim 12, further comprising:

determining, by the electronic device, whether a call is in progress, wherein the identifying of the function being executed by the electronic device includes identifying, by the electronic device, the function being executed based on a result of determining whether the call is in progress.

17. The method of claim 12, further comprising:

controlling, by the electronic device, an amount of data transmitted/received through the communication circuitry per unit time.

18. The method of claim 12, further comprising:

controlling, by the electronic device, a transmission period of data transmitted/received through the communication circuitry.

19. The method of claim 12, further comprising:

detecting, by the electronic device, at least one of a magnitude of sound output through the speaker or noise generated inside the electronic device, wherein the controlling of the output power of the communication circuitry includes controlling, by the electronic device, the output power of the communication circuitry further based on at least one of the detected magnitude of sound or the detected noise.

20. The method of claim 12, wherein the communication circuitry supports short-range communication with an external electronic device.

21. A method performed by an electronic device, the method comprising:

performing, by the electronic device using communication circuitry of the electronic device, short-range communication with an external electronic device; and in response to receiving an input for controlling a volume of a speaker of the electronic device, controlling, by the electronic device, an output power of the communication circuitry based on an input volume of the speaker.

22. The method of claim 21, further comprising:

determining, by the electronic device, whether an active noise cancellation function is being executed; and controlling, by the electronic device, the output power of the communication circuitry further based on a result of determining whether the active noise cancellation function is being executed.

* * * * *